US011061520B2

United States Patent
Bytheway et al.

(10) Patent No.: US 11,061,520 B2
(45) Date of Patent: Jul. 13, 2021

(54) FINGER TRACKING IN AN INPUT DEVICE WITH PROXIMITY SENSING

(71) Applicant: CIRQUE CORPORATION, Salt Lake City, UT (US)

(72) Inventors: Jared G. Bytheway, Sandy, UT (US); David C. Taylor, West Jordan, UT (US); Jon Alan Bertrand, Taylorsville, UT (US)

(73) Assignee: Cirque Corporation, Sandy, UT (US)

( * ) Notice: Subject to any disclaimer, the term of this patent is extended or adjusted under 35 U.S.C. 154(b) by 259 days.

(21) Appl. No.: 15/796,598

(22) Filed: Oct. 27, 2017

(65) Prior Publication Data

US 2018/0121014 A1 May 3, 2018

Related U.S. Application Data

(60) Provisional application No. 62/413,841, filed on Oct. 27, 2016.

(51) Int. Cl.
*G06F 3/041* (2006.01)
*G06F 3/044* (2006.01)

(52) U.S. Cl.
CPC .......... *G06F 3/0446* (2019.05); *G06F 3/0444* (2019.05); *G06F 2203/04101* (2013.01)

(58) Field of Classification Search
None
See application file for complete search history.

(56) References Cited

U.S. PATENT DOCUMENTS

| 5,796,827 | A  | * | 8/1998  | Coppersmith | H04L 9/3226 713/182 |
| 5,914,701 | A  | * | 6/1999  | Gersheneld  | G06F 3/017 345/156  |
| 6,281,888 | B1 | * | 8/2001  | Hoffman     | G06F 3/044 178/18.01 |
| 6,350,055 | B1 |   | 2/2002  | Barras      |                     |
| 8,624,836 | B1 |   | 1/2014  | Miller et al. |                   |
| 2004/0239648 | A1 | * | 12/2004 | Abdallah | G06K 9/00087 345/173 |
| 2007/0002815 | A1 | * | 1/2007  | Ishibashi | G07C 9/28 370/338 |
| 2008/0231603 | A1 | * | 9/2008  | Parkinson | B60K 37/06 345/173 |
| 2009/0267912 | A1 | * | 10/2009 | Wada      | G06F 3/0488 345/173 |
| 2010/0149126 | A1 | * | 6/2010  | Futter    | G06F 1/3231 345/174 |
| 2012/0038520 | A1 | * | 2/2012  | Cornwell  | H01Q 1/24 343/702 |
| 2012/0050180 | A1 | * | 3/2012  | King      | G06F 3/04166 345/173 |

(Continued)

*Primary Examiner* — Benjamin C Lee
*Assistant Examiner* — Emily J Frank

(57) ABSTRACT

A system and method for increasing the proximity sensing distance of a touch and proximity sensitive touch sensor to thereby enable greater distance of detectability of a user in a proximity sensing mode of a touch sensor by driving a time varying voltage or drive signal onto a user who is also holding a touch sensor with at least one hand, and then sensing the drive signal from the user's fingers or thumb on sense electrodes that are on the touch sensor when the fingers are within a proximity sensing distance of sense electrodes in the touch sensor.

10 Claims, 5 Drawing Sheets

(56) References Cited

U.S. PATENT DOCUMENTS

| | | | |
|---|---|---|---|
| 2014/0184555 A1* | 7/2014 | Pi | H04W 76/14 |
| | | | 345/174 |
| 2014/0197531 A1* | 7/2014 | Bolognia | H01L 25/16 |
| | | | 257/693 |
| 2015/0044969 A1* | 2/2015 | Tucker | H04B 7/26 |
| | | | 455/41.2 |
| 2015/0149310 A1 | 5/2015 | He et al. | |
| 2017/0055911 A1* | 3/2017 | Wijayaratna | G16H 40/63 |
| 2017/0228101 A1* | 8/2017 | Legros | G06F 3/0418 |
| 2018/0004310 A1* | 1/2018 | Drum | G05G 9/047 |
| 2018/0059866 A1* | 3/2018 | Drake | G06F 3/0446 |

* cited by examiner ized. The desired outcome is to detect one or more fingers of the user farther from the touch sensor than would be possible using standard self or mutual capacitance techniques.

FINGER TRACKING IN AN INPUT DEVICE WITH PROXIMITY SENSING

BACKGROUND OF THE INVENTION

Field of the Invention

This invention relates generally to touch and proximity sensors. More specifically, the invention relates to the ability to improve tracking of fingers that is holding a touch and proximity sensitive device.

Description of Related Art

There are several designs for capacitive flow sensors which may be used in the present invention. It is useful to examine the underlying technology of the touch sensors to better understand how any capacitance sensitive touchpad can take advantage of the present invention.

The CIRQUE® Corporation touchpad is a mutual capacitance-sensing device and an example is illustrated as a block diagram in FIG. 1. In this touchpad 10, a grid of X (12) and Y (14) electrodes and a sense electrode 16 is used to define the touch-sensitive area 18 of the touchpad. Typically, the touchpad 10 is a rectangular grid of approximately 16 by 12 electrodes, or 8 by 6 electrodes when there are space constraints. Interlaced with these X (12) and Y (14) (or row and column) electrodes is a single sense electrode 16. All position measurements are made through the sense electrode 16.

The CIRQUE® Corporation touchpad 10 measures an imbalance in electrical charge on the sense line 16. When no pointing object is on or in proximity to the touchpad 10, the touchpad circuitry 20 is in a balanced state, and there is no charge imbalance on the sense line 16. When a pointing object creates imbalance because of capacitive coupling when the object approaches or touches a touch surface (the sensing area 18 of the touchpad 10), a change in capacitance occurs on the electrodes 12, 14. What is measured is the change in capacitance, but not the absolute capacitance value on the electrodes 12, 14. The touchpad 10 determines the change in capacitance by measuring the amount of charge that must be injected onto the sense line 16 to reestablish or regain balance of charge on the sense line.

The system above is utilized to determine the position of a finger on or in proximity to a touchpad 10 as follows. This example describes row electrodes 12, and is repeated in the same manner for the column electrodes 14. The values obtained from the row and column electrode measurements determine an intersection which is the centroid of the pointing object on or in proximity to the touchpad 10.

In the first step, a first set of row electrodes 12 are driven with a first signal from P, N generator 22, and a different but adjacent second set of row electrodes are driven with a second signal from the P, N generator. The touchpad circuitry 20 obtains a value from the sense line 16 using a mutual capacitance measuring device 26 that indicates which row electrode is closest to the pointing object. However, the touchpad circuitry 20 under the control of some microcontroller 28 cannot yet determine on which side of the row electrode the pointing object is located, nor can the touchpad circuitry 20 determine just how far the pointing object is located away from the electrode. Thus, the system shifts by one electrode the group of electrodes 12 to be driven. In other words, the electrode on one side of the group is added, while the electrode on the opposite side of the group is no longer driven. The new group is then driven by the P, N generator 22 and a second measurement of the sense line 16 is taken.

From these two measurements, it is possible to determine on which side of the row electrode the pointing object is located, and how far away. Using an equation that compares the magnitude of the two signals measured then performs pointing object position determination.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes 12, 14 on the same rows and columns, and other factors that are not material to the present invention. The process above is repeated for the Y or column electrodes 14 using a P, N generator 24

Although the CIRQUE® touchpad described above uses a grid of X and Y electrodes 12, 14 and a separate and single sense electrode 16, the sense electrode can actually be the X or Y electrodes 12, 14 by using multiplexing.

Handheld or portable electronic devices have become prolific in recent years. These devices include but are not limited to smartphones, video game controllers, portable video games, TV remotes, cameras, augmented reality glasses, virtual reality glasses, multimedia players, etc.

There has been a trend to increase capabilities by providing new methods of interacting with portable electronic appliances. One challenge is to create a user input that is intuitive and efficient. One specific example is the desire to track fingers not just in contact with a touch panel, touch screen, touchpad, touch surface or touch sensor, but also in three-dimensional space.

Typical capacitive touch sensors operate in mutual capacitive or self-capacitive modes. In mutual capacitance mode, at least one electrode, such as a drive electrode, may be driven with a varying voltage, and with at least another electrode, such as a sense electrode, sensing a signal. When a finger or other conductive object comes in proximity of a junction between a transmit (drive electrode) and receive (sense electrode) electrodes of co-planar X and Y electrode grids, the signal coupling between the drive and sense electrodes decreases when the pointing object is grounded, or the signal coupling may be increased when the pointing object is a small electrically floating object.

In self-capacitance mode, at least one electrode is driven with a varying voltage while capacitive loading of sense electrodes is being measured. When a grounded and conductive object comes in proximity to the X and Y electrodes, the capacitive loading on the sense electrodes increases. Both mutual capacitance and self-capacitance methods may be limited to object detection at relatively short distances.

BRIEF SUMMARY OF THE INVENTION

In a first embodiment, the present invention is a system and method for increasing the proximity sensing distance of a touch and proximity sensitive touch sensor to thereby enable greater distance of detectability of a user in a proximity sensing mode of a touch sensor by driving a time varying voltage or drive signal onto a user who is also holding a touch sensor with at least one hand, and then sensing the drive signal from the user's fingers or thumb on sense electrodes that are on the touch sensor when the fingers are within a proximity sensing distance of sense electrodes in the touch sensor.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

A first embodiment may be directed to increasing a proximity sensing distance of a touch and proximity sensing device (hereinafter a "touch sensor") to allow greater detection distance of a detectable object. The first embodiment may also enable new applications of the touch sensor.

Figure 1:
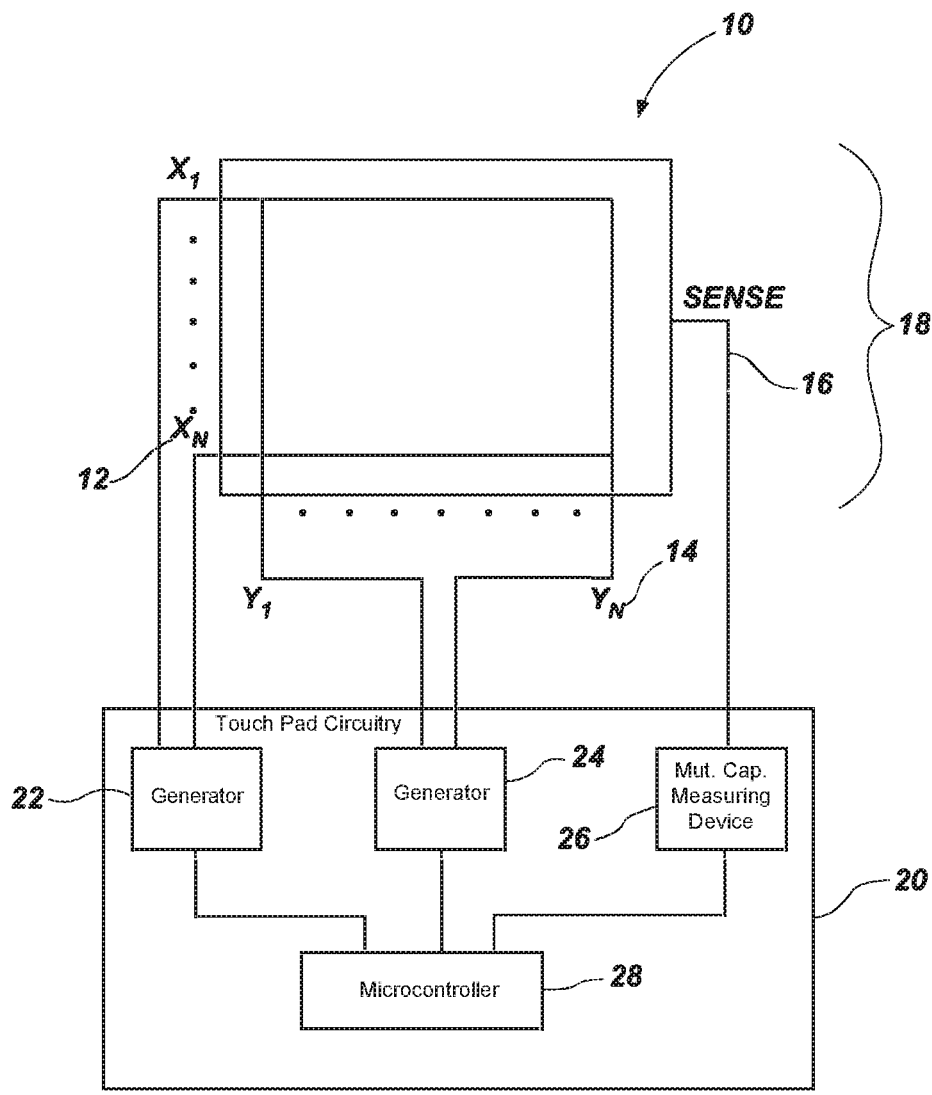
FIG. 1 is a block diagram of operation of a touchpad that is found in the prior art, and which is adaptable for use in the present invention.
Figure 2:
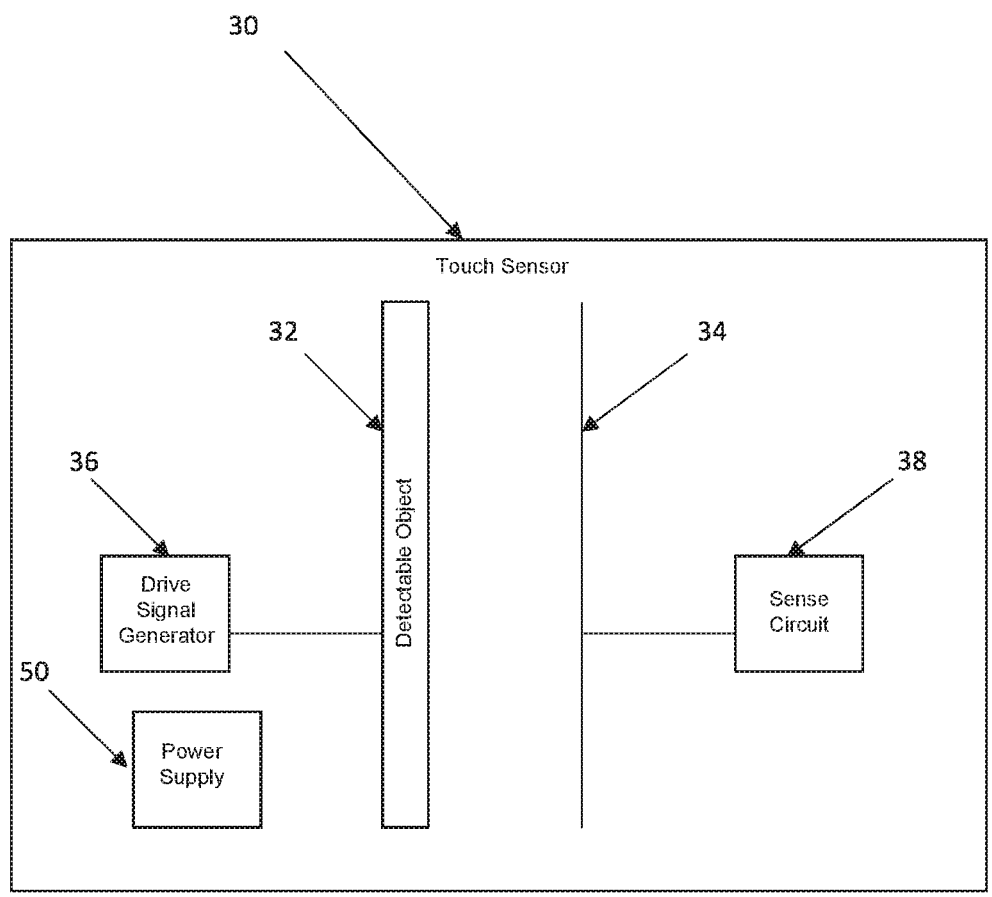
FIG. 2 is a block diagram of the first embodiment of the invention.

FIG. 2 is a block diagram of the concept of the first embodiment. FIG. 2 shows a touch sensor 30 comprised of at least one detectable object 32 and at least one sense electrode 34, a drive signal generator 36, a sense circuit 38 and a power supply 50. The power supply provides energy for both the drive signal generator 36 and the sense circuit 38. The at least one detectable object 32 and the sense electrode 34 are shown as being adjacent to each other. However, this physical relationship is for illustration purposes only and is not a limiting factor of the first embodiment. The drive electrode must be coupled in some way to the user so that the user becomes an extension of a signal on the at least one drive electrode 32 as will be explained.

It should be understood that there may be a plurality of sense electrodes 34, all of which do not alter the operation of the first embodiment. In other words, a plurality of sense electrodes 34 does not change how the touch sensor 40 may operate. However, a plurality of sense electrodes 34 may increase a volume of space in which the at least one drive electrode 32 may be detectable by the at least one sense electrode 34 of the touch sensor 30.

While the at least one drive electrode 32 is shown as a rectangular object, the at least one detectable object may have any shape and may have numerous projections. For example, the at least one drive electrode 32 may be an electrode that is coupled to a user's hand with a plurality of fingers and a thumb. In effect, the user's hand becomes the drive electrode 32.

Figure 3:
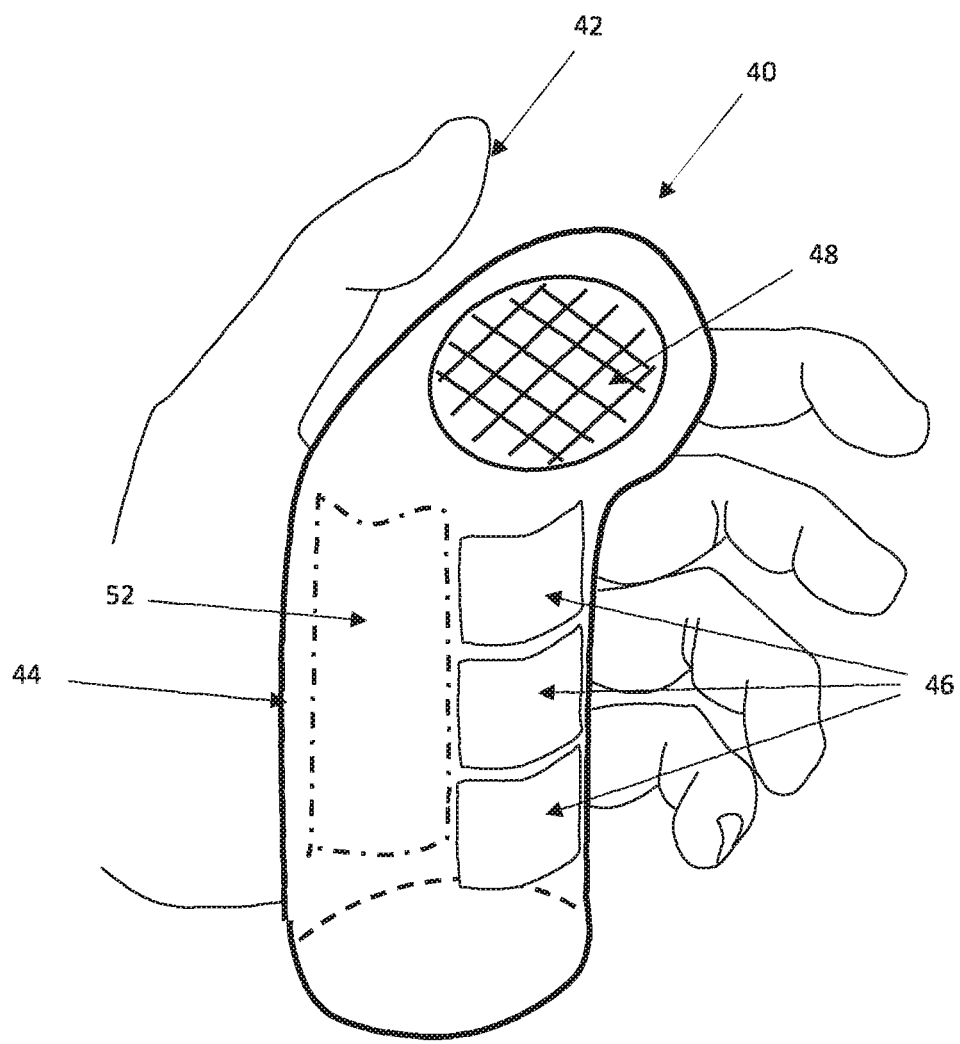
FIG. 3 is a perspective view of a first embodiment of the invention showing a hand and a cylindrical touch sensor.

An illustration of how the first embodiment may be implemented is in a handheld touch sensor 40 as shown in FIG. 3. FIG. 3 shows a touch sensor 40 comprised of a housing for an object that may be gripped by a user's hand 42. For example, the touch sensor 40 may by an object having an ergonomically pleasing grip that allows the fingers and thumb of the user's hand 42 to be placed at predetermined locations on the touch sensor 40.

These predetermined locations may be the natural resting places for the hand 42 that is holding onto an object that may function as a touch sensor. In this example, the touch sensor 40 may be substantially cylindrical in shape as shown in FIG. 3. The touch sensor 40 may have a substantially cylindrical body 44 with a plurality of touch sensor pads 46 disposed at various locations on the touch sensor 40.

The locations of the touch sensor pads 46 on the housing of the touch sensor 40 may either be at locations that a user is likely to touch when holding the touch sensor 40, or at locations that the user needs to touch in order to interact with the touch sensor.

For example, the touch sensor pads 46 that are disposed on the cylindrical body may be disposed where a palm of a hand and fingertips are likely to rest when a user is holding the touch sensor 40 in a manner that suggests that the user is going to use the touch sensor. However, in this example, a touch sensor display or touch screen 48 may also be disposed on an end of the cylindrical body 44. There may be one or more touchscreens on the cylindrical body 44 of the touch sensor 40. In this example, the touchscreen 48 may be larger or smaller than the other touch sensor pads 46 and may be capable of tracking a location and movement of the user's thumb and not just the presence of the thumb. Thus, the smaller touch sensor pads 46 may only be used to detect the presence or approach of a detectable object, and other touchscreen 48 may have more capabilities and provide greater functionality, such as that of a touch sensor as known to those skilled in the art where detection and tracking is performed.

The first embodiment not only includes the touch sensor pads 46 and the touchscreen 48 that detect the presence or location of the user's hand, fingers and thumb, but may also include a system for driving a signal onto the user that is detectable by the touch sensor 30.

In the first embodiment, the drive signal generator 36 may drive a time varying voltage (the "drive signal" or "signal") onto a user holding the touch sensor 40 and then sense a coupled voltage from the drive signal that may be present on the user's fingers or thumb. The signal may be detectable on the touch sensor pads 46 and the touchscreen 48 of the touch sensor 40. Thus, the touch sensor pads 46 and the touchscreen 48 may be coupled via sense electrodes 34 to the sense circuit 38 that is disposed within the touch sensor 40. The sense circuit 38 may be disposed on a rigid or flexible circuit board that is disposed within the touch sensor 40, or even on the housing of the touch sensor itself.

The touch sensor 40 may include a power supply for providing power to the drive signal generator 36 and the sense circuit 38. In this first embodiment, the drive signal generator 36, the sense circuit 38, a power supply 50, the at least one drive electrode 32 and the at least one sense electrode 34 may all be disposed within the touch sensor 40.

In the first embodiment of the invention, the at least one drive electrode may form a direct galvanic connection to the user. For example, this may be done by driving an exposed drive electrode conductor 52 on the housing of the touch sensor 40 that comes in direct contact with the user's skin such as a hand. For example, the large palm conductor 52 shown using hidden lines in FIG. 3 may be the connection of the drive electrode 32 to the user.

Alternatively, the connection may not be direct contact. For example, it is noted that the at least one drive electrode 32 may begin within the touch sensor 40 but may be extended beyond a housing of the touch sensor in order to be coupled to the user. For example, the drive electrode 32 may be in the form of a capacitive connection.

One way of making a capacitive connection may be to make the drive electrode 32 have a large enough surface area and be close enough to some part of the user such that a sufficiently large drive signal may be transferred to the user. For example, a metal plate in the touch sensor 40 of approximately 12 square centimeters and at a distance of approximately 1 mm to the user's hand may be adequate to capacitively couple a sufficiently large signal to the user, but it may also be a larger or smaller metal plate. The metal plate may be on the inside or the outside of the housing of the touch sensor 40.

Figure 4:
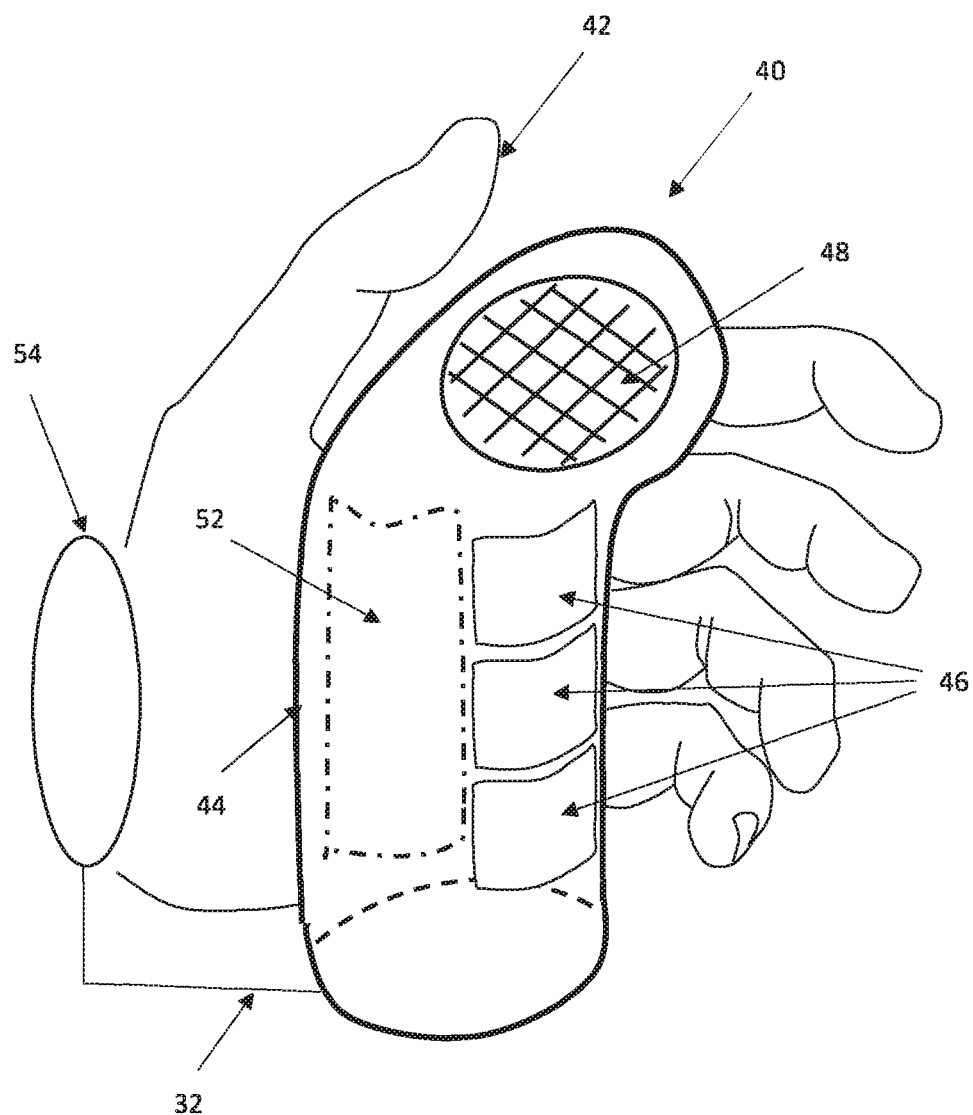
FIG. 4 is a perspective view of an alternative embodiment of the invention showing a hand and a cylindrical touch sensor and a wrist strap.

In another alternative embodiment shown in FIG. 4, the drive electrode 32 may make contact with the user by being part of a flexible strap 54 that contains the drive electrode 32. The drive electrode 32 may be coupled at a first end to the drive signal generator 36 within the housing of the touch sensor 40, and at a second end to the strap 54 that may be wrapped around the user's hand or wrist.

The drive electrode 32 may be a metal, an organic material or an inorganic compound. The drive electrode 32 may also be flexible or rigid. What is important is that the drive electrode 32 be coupled capacitively or make direct contact with the user.

In another aspect of the invention, a handheld touch sensor 40 may typically be electrically isolated from earth ground and be battery powered with power supply 50. For these reasons, a drive electrode 32 that is coupled to a user holding a handheld touch sensor may become a voltage reference and may also result in modulating the power supply and the components that may be galvanically connected to it.

In another embodiment, the power supply 50 of the touch sensor 40 may be coupled to an external ground reference such as a battery charger or USB connection. In this case the user may still be driven with a voltage but the handheld touch sensor 40 ground reference is not being modulated.

The first embodiment may also include a feature shown in FIGS. 3 and 4. The figures show that the touchscreen 48 may provide visual feedback from a touchscreen 48 to the user holding the touch sensor 40, as well as provide input.

The touch sensor 40 may also include virtual buttons on the touchscreen 48 that are capacitively sensed areas that may be activated and deactivated when a finger comes within a proximity distance or by touch, and may be labeled as a button. Furthermore, the location of the virtual buttons on the touchscreen 48 may be changed in order to provide different functionality, depending on what is being shown on the touchscreen 48.

In all of the embodiments of the invention, the invention may substantially increase the distance at which a detectable object such as a user's finger or thumb is detectable by the touch sensor 40. This ability may be useful for adding functionality to the touch sensor 40 such as lighting up an area around a virtual button on the touchscreen 48 when a finger comes close to it.

Another use of the embodiments of the invention may be to indicate on the touch sensor 40 the location of a finger that is hovering above or moving toward the touch sensor 40, but without triggering any other input to the touch sensor. In other words, the approach of a detectable object to the touch sensor pads 46 or the touchscreen 48 may cause some portion of the touch sensor 40 to give some visual, tactile or audible feedback to the user that a finger is approaching a particular touch sensor pad 46 or touchscreen 48 of the touch sensor.

Another aspect of the invention may be that the touch sensor 40 may be a typical state of the art touch sensor that has a drive and sense grid of X and Y electrodes that operate in a manner that is common to those skilled in the art. However, in another alternative embodiment, the touch sensor 40 may change the functionality of electrodes so that all the electrodes become drive electrodes 32 or sense electrode 34. Thus, the drive signal may be coming from a device other than the touch sensor 40, but still be detectable by the touch sensor.

Figure 5:
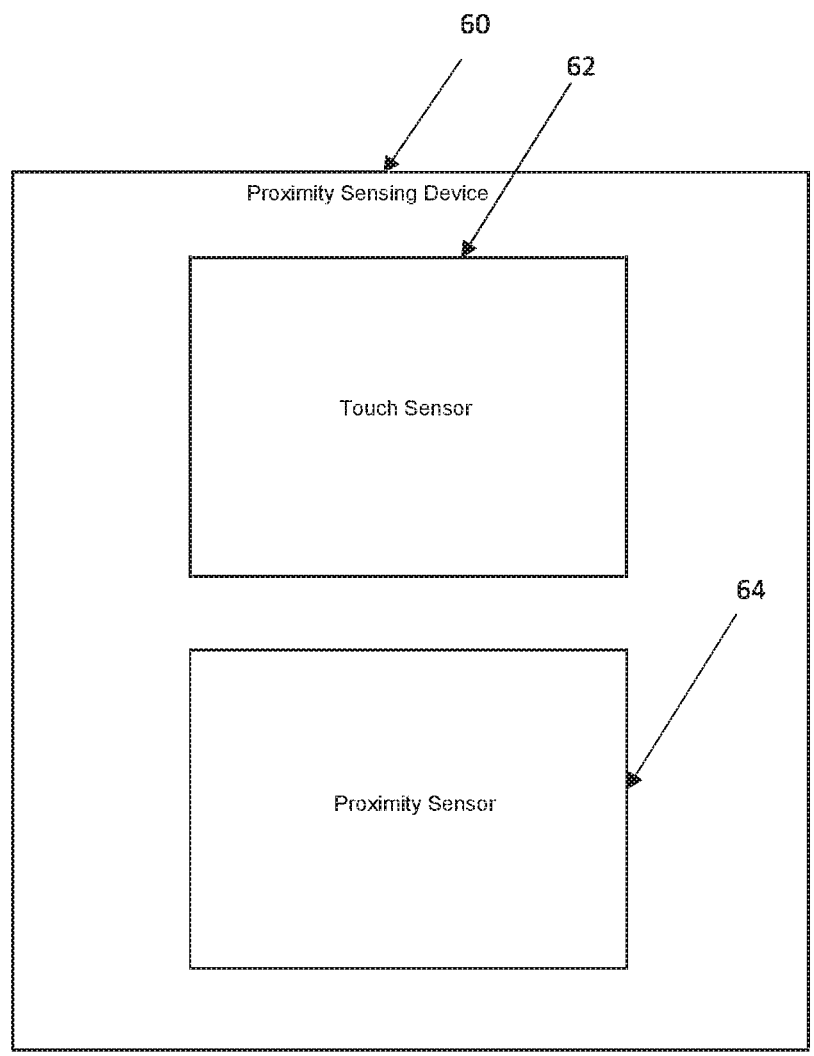
FIG. 5 is a block diagram showing that a touch sensor and a proximity sensor may be disposed in the same housing but use separate drive signals, drive signal generators and drive and sense electrodes.

FIG. 5 shows in a block diagram that in another embodiment of the invention, the functionality of a touch sensor and a proximity sensing may be separated in a single touch and proximity sensing device 60. In this embodiment of the invention, there may be two drive signal generators and separate drive electrodes and sense electrodes, one drive signal generator for a portion of the device that is operating as a touch sensor 62, and a different drive signal generator and drive electrodes and sense electrodes for a portion of the device 60 that is operating as a proximity sensor 64.

An application of the embodiments of the invention may be in a Virtual Reality (VR) system where the user can't see their own hands directly, or in an Augmented Reality system where the user can see, but requires more ways to interact with the AR even if sight is used.

In a VR system, some users may have problems locating certain buttons on a handheld game controller when they can't see their hands. The embodiments of this invention may enable the VR system to show the user the location of their own fingers above a touch surface of the handheld touch sensor so the user may touch the correct buttons or controls. This may also be used for VR actions such as grasping objects in VR, pointing, variable trigger actions, variable squeezing, flicking, fist clinching etc.

While all of these abilities are useful in VR, they are also useful in AR. Consider an AR device such as a smartphone or glasses that may combine virtual and real objects and combine them on a display, such as the display of a smartphone or a lens of AR glasses.

In one embodiment of the invention, a device such as a smartphone or glasses may generate the drive signal that is detectable by the separate handheld touch sensor 40, or the handheld touch sensor may generate the drive signal that is detectable by the smartphone or glasses.

The above embodiments described handheld device applications of the present invention but others are possible. In another embodiment the driving electrode is in a seat of a vehicle. In this application, multiple drive electrodes may be used in multiple seats on the same touch sense electrodes. In this case the driving electrode can be used to distinguish between the different users that are interacting with a device. This can be particularly useful in an automotive application where driver and co-driver recognition is desired.

In summary, the most basic form of the first embodiment of the invention is as follows. The first embodiment is a system for increasing a proximity sensing distance of a touch and proximity sensor and the system is comprised of a housing for the touch and proximity sensor system, a power supply, a drive signal generator for generating a drive signal, at least one drive electrode for receiving the drive signal from the drive signal generator, at least one sense electrode, wherein the at least one sense electrode is capacitively coupled indirectly to the drive signal from the at least one drive electrode, a sense circuit for receiving the capacitively coupled drive signal on the at least one sense electrode, and a detectable object that receives the drive signal from the at least drive electrode, wherein the at least one sense electrode detects the drive electrode on the detectable object to thereby indirectly detect the drive signal from the drive electrode, wherein the detectable object is detectable by the sense circuit at a greater distance than if the detectable object did not receive the drive signal.

Similarly, the method of the first embodiment is to provide the same systems, and then to generate the drive signal on the at least one drive electrode, transfer the drive signal from the at least one drive electrode to the detectable object, capacitively couple the drive signal on the detectable object to the at least one sense electrode, and detect the detectable object using the sense circuit, wherein the detectable object is detectable by the sense circuit at a greater distance than if the detectable object did not receive the drive signal.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A system, comprising:
    a housing of the system having a grip that allows at least some fingers other than a thumb extending from a palm of a hand to be placed at a first predetermined location on the housing and allows the thumb extending from the palm to be placed at a second predetermined location on the housing while grasping the grip;
    a first touch surface at the first predetermined location;
    a second touch surface at the second predetermined location;
    a power supply;
    a drive signal generator configured to generate a drive signal;
    each of the first touch surface and the second touch surface having a grid of drive electrodes and sense electrodes;
    at least one drive electrode connected to the each grid configured to receive the drive signal from the drive signal generator;
    at least one sense electrode of the each grid, wherein the at least one sense electrode is capacitively coupled indirectly to the drive signal from the at least one drive electrode on the each grid; and
    a sense circuit configured to measure a change in capacitance by receiving the capacitively coupled drive signal on the at least one sense electrode; and
    the palm of the hand receives the drive signal from the at least drive electrode via at least one drive electrode conductor in direct contact with or capacitively coupled to a wrist or the palm of the hand;
    wherein the at least one sense electrode from each of the first touch surface and the second touch surface detects the drive signal on the at least some fingers and/or the thumb, wherein the at least some fingers and/or the thumb are detectable by the sense circuit at a greater distance than if the wrist and/or the palm of the hand did not receive the drive signal.

2. The system as defined in claim 1 wherein the first touch surface is at least one touch sensor pad disposed on an exterior of the housing, wherein the at least one touch sensor pad is coupled to the at least one sense electrode, and wherein the at least one touch sensor pad detects a proximity and a touch of the at least some fingers on the at least one touch sensor pad.

3. The system as defined in claim 1 wherein the at least one drive electrode conductor is located on an exterior of the housing and makes direct contact with the palm of the hand when the hand is grasping the housing to thereby transfer the drive signal from the at least one drive electrode to the palm of the hand.

4. The system as defined in claim 1 wherein the at least one drive electrode conductor is located on an exterior of the housing and does not make direct contact with the palm of the hand, but instead is capacitively coupled to the palm of the hand to thereby transfer the drive signal from the at least one drive electrode to the palm of the hand.

5. The system as defined in claim 1 wherein the at least one drive electrode conductor is located on an interior of the housing, wherein the drive electrode conductor does not make direct contact with the palm of the hand, but instead is capacitively coupled to the palm of the hand to thereby transfer the drive signal from the at least one drive electrode to the palm of the hand.

6. A method for increasing a proximity sensing distance of a touch and proximity sensor system, said method comprising:
    providing a housing for the touch and proximity sensor system having a grip that allows at least some fingers other than a thumb extending from a palm of a hand to be placed at a first predetermined location on the housing and allows the thumb extending from the palm to be placed at a second predetermined location on the housing while grasping the grip;
    providing a power supply;
    providing a touch surface having a grid of drive electrodes and sense electrodes at the first predetermined location;
    disposing at least one touch sensor pad having at least one drive electrode and at least one sense electrode on an exterior of the housing at the second predetermined location;
    providing a drive signal generator for generating a drive signal, wherein at least one of the sense electrodes of each of the first and second predetermined locations is capacitively coupled indirectly to the drive signal from a respective at least one drive electrode of each of the first and second predetermined locations via a hand,
    providing a sense circuit for receiving the capacitively coupled drive signal on each of the at least one sense electrode, and grasping the housing by the hand that receives the drive signal;
    generating the drive signal on the at least one drive electrode of each of the first and second predetermined locations;
    transferring the drive signal from the at least one drive electrode of each of the first and second predetermined locations to a wrist or palm of the hand via at least one drive electrode conductor in direct contact with or capacitively coupled to the wrist or palm of the hand;

capacitively coupling the drive signal on the hand to a) the at least one sense electrode of the touch surface through at least one finger other than the thumb and/or b) the at least one sense electrode of the at least one touch pad through the thumb extending from the hand, depending on which finger or fingers are in proximity of or contacting the touch surface and/or at least one touch pad; and detecting the at least one finger other than the thumb or the thumb extending from the hand using the sense circuit by measuring a change in capacitance, wherein the at least one finger other than the thumb or the thumb is detectable by the sense circuit at a greater distance than if the hand did not receive the drive signal.

7. The method as defined in claim 6 wherein disposing the at least one drive electrode conductor is by disposing it on an exterior of the housing for making direct contact of the at least one drive electrode conductor with the wrist or palm of the hand.

8. The method as defined in claim 6 wherein the method further comprises:
providing the touch surface by disposing at least one touchscreen on the housing;
detecting a presence and movement of the thumb extending from the hand on the touchscreen; and
providing visual feedback to the user using the touchscreen.

9. The method as defined in claim 6 wherein the at least one drive electrode conductor is provided on an exterior of the housing for capacitively coupling the drive signal to the wrist or palm of the hand.

10. The method as defined in claim 6 wherein the at least one drive electrode conductor is provided on an interior of the housing for capacitively coupling the drive signal to the wrist or palm of the hand.

* * * * *